US007889402B2

(12) United States Patent
Chang et al.

(10) Patent No.: US 7,889,402 B2
(45) Date of Patent: Feb. 15, 2011

(54) METHOD FOR LIMITING TOTAL COLORANT COVERAGE USING MULTIDIMENSIONAL SIMPLICIAL SUBDIVISION AND BARYCENTRIC INTERPOLATION

(75) Inventors: James Zhixin Chang, Vancouver, WA (US); John C. Dalrymple, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 993 days.

(21) Appl. No.: 11/692,566

(22) Filed: Mar. 28, 2007

(65) Prior Publication Data

US 2008/0239340 A1 Oct. 2, 2008

(51) Int. Cl.
*H04N 1/46* (2006.01)
*G03F 3/08* (2006.01)
*H04N 1/21* (2006.01)
*H04N 1/23* (2006.01)

(52) U.S. Cl. .................. 358/504; 358/530; 358/521; 358/518; 358/296

(58) Field of Classification Search ............. 358/1.9, 358/296, 300, 500, 504, 518, 521, 530
See application file for complete search history.

(56) References Cited

U.S. PATENT DOCUMENTS

| | | | |
|---|---|---|---|
| 5,633,662 A | 5/1997 | Allen et al. |
| 5,799,136 A | 8/1998 | Li et al. |
| 5,841,951 A | 11/1998 | Shu et al. |
| 5,872,896 A | 2/1999 | Li et al. |
| 6,084,689 A | 7/2000 | Mo |
| 6,344,903 B1 | 2/2002 | Derhak et al. |
| 6,435,657 B1 | 8/2002 | Couwenhaven et al. |
| 6,923,523 B2 | 8/2005 | Nishikawa et al. |
| 6,997,543 B2 | 2/2006 | DeBaer |
| 7,019,868 B2 | 3/2006 | Chang et al. |
| 7,023,570 B2 | 4/2006 | Marsden et al. |
| 7,050,196 B1 | 5/2006 | Piatt et al. |
| 7,265,870 B2 | 9/2007 | Velde et al. |
| 7,436,543 B2 | 10/2008 | Yamamoto et al. |

(Continued)

FOREIGN PATENT DOCUMENTS

EP      1437678      7/2004

(Continued)

*Primary Examiner*—James A Thompson
(74) *Attorney, Agent, or Firm*—Kirton & McConkie; Michael F. Krieger; Adam D. Stevens

(57) ABSTRACT

Systems and methods for limiting total colorant in a color rendering system are disclosed. Implementation of the present invention provides for transformation of a specified colorant in which the sum of the colorant components exceeds a total area coverage (TAC) limit to create a second or resultant colorant in which the sum of the colorant components is within the limit. Using a bijective transformation, colorant sampling and other manipulations can be performed using a nominal hypercube space and the results can be compressed from the nominal space back to the actual colorant-limited space, simplifying manipulation of the colorant-limited polytope space. The unlimited colorant hypercube may be divided into simplexes. For each simplex, intersection points may be found between the TAC limit and the edges of the simplex. A barycentric interpolation technique may then be used to map the unlimited simplex onto a corresponding simplex within the colorant-limited polytope.

20 Claims, 4 Drawing Sheets

U.S. PATENT DOCUMENTS

| | | |
|---|---|---|
| 2002/0102019 A1* | 8/2002 | Piatt et al. .................... 382/165 |
| 2003/0020931 A1 | 1/2003 | Harrington |
| 2005/0243119 A1 | 11/2005 | Kuhn et al. |
| 2005/0243336 A1 | 11/2005 | Kuhn et al. |
| 2005/0243337 A1 | 11/2005 | Kuhn et al. |
| 2005/0243339 A1* | 11/2005 | Kuhn et al. ................... 358/1.9 |
| 2005/0248598 A1 | 11/2005 | Piatt et al. |
| 2006/0012811 A1* | 1/2006 | Dalrymple et al. ........... 358/1.9 |

FOREIGN PATENT DOCUMENTS

| | | |
|---|---|---|
| JP | 2003-198863 | 7/2003 |
| JP | 2003-219190 | 7/2003 |
| JP | 2004-58626 | 2/2004 |
| JP | 2004-338098 | 12/2004 |

* cited by examiner

METHOD FOR LIMITING TOTAL COLORANT COVERAGE USING MULTIDIMENSIONAL SIMPLICIAL SUBDIVISION AND BARYCENTRIC INTERPOLATION

BACKGROUND OF THE INVENTION

1. Field of the Invention

Embodiments of the present invention relate to multi-colorant rendering and printing. In particular, the embodiments of the present invention relate to systems and methods for limiting total colorant in a printing device or color rendering system using multidimensional simplicial subdivision and barycentric interpolation.

2. Background and Related Art

Current color printing technologies available to consumers include color printers that use various color combinations to reproduce any of a variety of colors. One such example is a color ink jet printer that propels droplets of ink directly onto paper. Low-end ink jet printers typically employ three ink colors (cyan, magenta and yellow) (CMY) to form the various color combinations to reproduce a variety of colors. For example, three-color ink jet printers produce a composite black. Four-color ink jet printers use cyan, magenta, yellow and black (CMYK). Other types of printers include laser or electrophotographic printers, dye sublimation, and other printer types that may also use CMY or CMYK colorant schemes. Certain printers or color rendering devices may use more than three or four colorant colors.

A variety of different kinds of paper, media, or other substrates may be used in association with many printers. However, each type of paper includes characteristics that affect the printing on the particular media. For example, certain clay-coated and other specialty papers can greatly improve the printed results when compared to regular copy paper because the clay-coated or other specialty paper does not absorb the ink in the same fashion as the regular copy paper.

While a wide variety of printers are available for use, problems still exist. The printing of a color image typically includes applying a number of colorants to the paper or output media. The color that is produced on the output media is dependent on the amount of each colorant that is applied to the output media. The amount of a colorant can be expressed as a percentage of up to a maximum amount of colorant that could be deposited by a deposition apparatus. Each color of colorant can be deposited up to 100%. The total amount of colorant applied to a given region of an output medium is the combined amounts of each color of colorant deposited on the region.

For example, in a four-colorant printing system, a color can be expressed as a percentage of the maximum cyan, magenta, yellow and black colorants. In such a system, theoretically, up to 400% of colorant (up to 100% of each color colorant) may be deposited on a selected region.

However, the output media typically includes a total area coverage (TAC) limit, sometimes informally referred to as the ink limit (even when the colorants are not inks per se), for the applied colorant. The TAC limit represents the maximum total amount of colorant that can be applied to a given area of the output media up to a saturation level. Such limits may be dependent on the type of media used for printing, such as the type of paper. TAC limits are generally established to avoid "failure modes" of physical print processes. Thus, if the total color combination exceeds the TAC limit the media may be over-inked, which may cause mechanical problems, image quality problems, drying problems, etc. For electrophotographic printers that use CMYK colorants, for example, a TAC limit might be set at 280% while the maximum allowable amount for any single colorant might be 100%. If the total amount of applied colorant in such a system exceeds 280%, the toners might not reliably adhere to the paper, print quality may be adversely affected, and/or the printer mechanisms might become contaminated by excess unfused toner.

Therefore, in developing printer firmware, print drivers, color profiling software, color management modules (CMMs) and the like, it is necessary to implement measures to ensure that the TAC limit appropriate for the print process (including substrate, paper, or other media) is not exceeded. Conventional methods of colorant limitation have significant problems. These conventional methods include clipping out-of-limit values onto the limit and scaling the individual printing colorants. Clipping out-of-limit values, however, is not invertible, and scaling individual printing colorants does not utilize the entire colorant-limited gamut of colors.

BRIEF SUMMARY OF THE INVENTION

Embodiments of the present invention relate to multi-colorant rendering and printing. In particular, embodiments of the present invention relate to systems and methods for limiting total colorant in a printing device or color rendering system using multidimensional simplicial subdivision and barycentric interpolation. Moreover, embodiments of the present invention relate to systems and methods for limiting total colorant coverage in multi-colorant rendering.

Implementation of the embodiments of the present invention takes place in association with the transformation of a specified colorant in which the sum of the colorant components exceeds a specified maximum value to create a second or resultant colorant in which the sum of the colorant components is limited to being within the specified maximum value. Accordingly, the transformed resultant colorant is output within the total area coverage (TAC) limit.

In at least some implementations, a computer device is utilized to create the second or resultant color. In at least one implementation, an n-channel colorant space without a TAC limit may be represented by an n-dimensional hypercube that is algorithmically straightforward to sample and manipulate. When a TAC constraint is applied, however, the available colorant space becomes an irregular polytope that is more difficult to sample and manipulate. The inventive method may be used to develop a bijective transformation between the colorant-limited polytope and a "nominal colorant space" that fills a hypercube. With the bijective transformation, colorant sampling and other manipulations may be performed using the nominal colorant space hypercube, which is easier to sample and manipulate, and then the results from the nominal space may be compressed back to the actual colorant-limited space.

The inventive method first divides the unlimited colorant hypercube into simplexes. Then, for each simplex, intersection points are found between the hyperplane representing the TAC limit or constraint and the edges of the simplex. A barycentric interpolation technique may then be used to map the unlimited simplex onto a corresponding simplex within the colorant-limited polytope.

The methods and processes of the embodiments of the present invention have proven to be useful in association with ink jet printers, electrophotographic (EP) engines, and any other printing process to limit the total colorant coverage in multi-colorant rendering. Examples include printers, copiers, fax machines, plotters, multi-functional peripherals, monitors, etc. that employ multi-colorant rendering. Those skilled in the art can readily appreciate that the methods and processes can be used in a variety of different applications and in a variety of different processes to limit the total colorant coverage in multi-colorant rendering of all types. The inventive method may be realized in conjunction with a computer device, and may be carried out in hardware or software on a computer device, a client computer device, a server, a printing device, a color-rendering device, a multifunction device, or any other device known in the art.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Embodiments of the present invention relate to multi-colorant rendering and printing. In particular, embodiments of the present invention relate to systems and methods for limiting total colorant in a printing device or color rendering system using multidimensional simplicial subdivision and barycentric interpolation. Moreover, at least some embodiments of the present invention relate to systems and methods for limiting total colorant coverage in multi-colorant rendering.

Embodiments of the present invention take place in association with the transformation of a specified colorant to create a second or resultant colorant in which the sum of the colorant components is not greater than a specified maximum value. Accordingly, the transformed resultant colorant is output within the total colorant coverage limit. The embodiments of the present invention solve the problem of representing the colorant-limited printer signal space, which is an irregular polytope, by transforming it onto a regular cube or hypercube. The inventive method constructs a bijective mapping between the nominal unlimited colorant cube or hypercube and the irregular colorant-limited polytope based on simplicial subdivision and barycentric interpolation.

In some embodiments, a computer device is utilized to create the second or resultant color. Accordingly, disclosure relating to a computer device is provided below. In at least one implementation, an n-channel colorant space without a TAC limit may be represented by an n-dimensional hypercube that is algorithmically straightforward to sample and manipulate. When a TAC constraint is applied, however, the available colorant space becomes an irregular polytope that is more difficult to sample and manipulate. The inventive method may be used to develop a bijective transformation between the colorant-limited polytope and a "nominal colorant space" that fills a hypercube. With the bijective transformation, colorant sampling and other manipulations may be performed using the nominal colorant space hypercube, which is easier to sample and manipulate, and then the results from the nominal space may be compressed back to the actual colorant-limited space.

The inventive method first divides the unlimited colorant hypercube into simplexes. Then, for each simplex, intersection points are found between the hyperplane representing the TAC limit or constraint and the edges of the simplex. A barycentric interpolation technique may then be used to map the unlimited simplex onto a corresponding simplex within the colorant-limited polytope.

The following disclosure of embodiments of the present invention is grouped into two subheadings, namely "Exemplary Operating Environment" and "Limiting Total Colorant Coverage." The utilization of the subheadings is for convenience of the reader only and is not to be construed as limiting in any sense.

Exemplary Operating Environment

Figure 1:
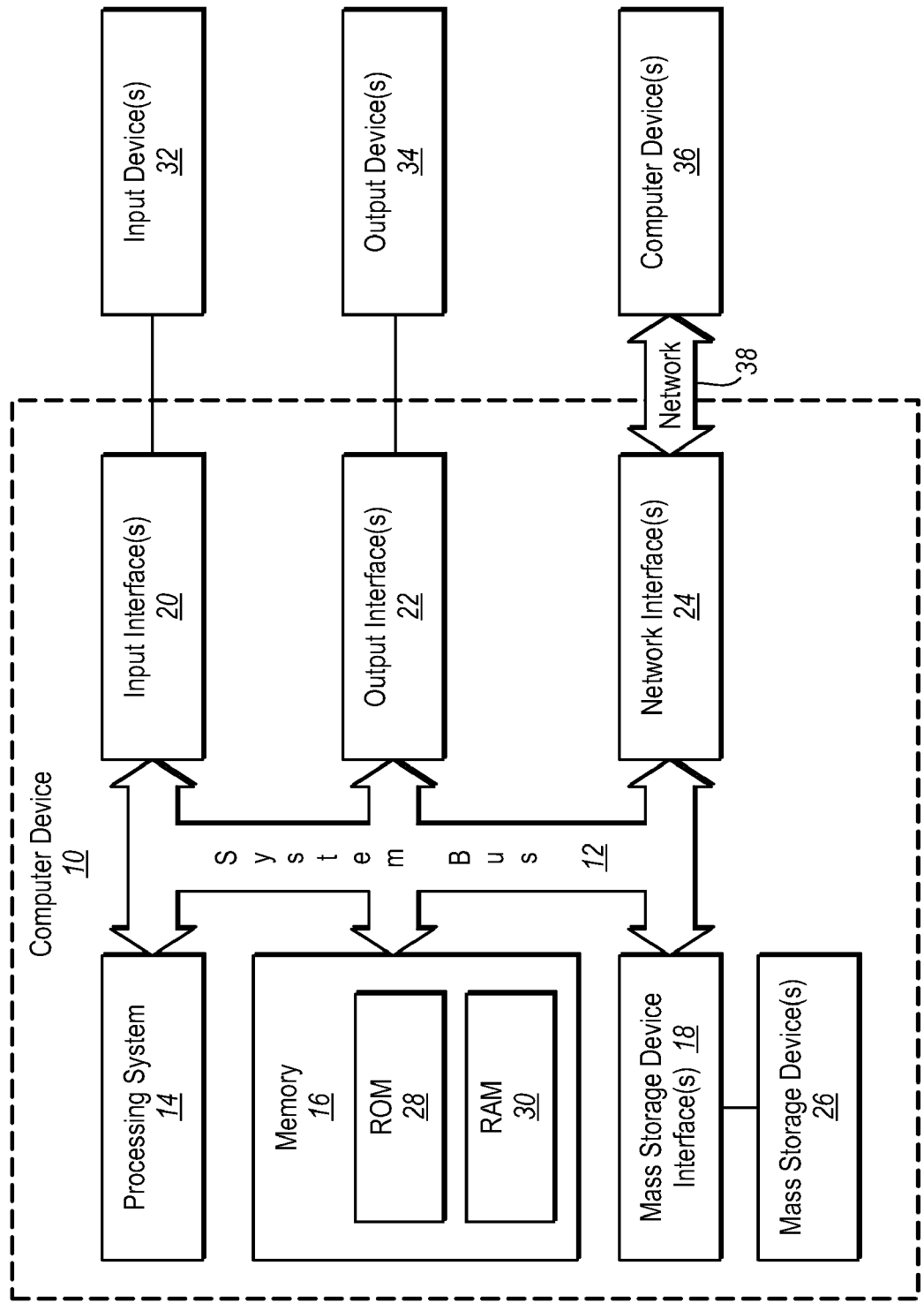
FIG. 1 illustrates a representative system that provides a suitable operating environment for use with embodiments of the present invention.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EE-PROM"), compact disk read-only memory ("CD-ROM"), or any other device or component that is capable of providing data or executable instructions that may be accessed by a processing system.

With reference to FIG. 1, a representative system for implementing embodiments of the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Those skilled in the art will appreciate that embodiments of the present invention embrace a variety of different system configurations. For example, in one embodiment the system configuration includes an output device (e.g., a multifunctional peripheral (MFP) or other printer/plotter, a copy machine, a facsimile machine, a monitor, etc.) that performs multi-colorant rendering. In another embodiment, the system configuration includes one or more client computer devices, optionally one or more server computer devices, and a connection or network communication that enables the exchange of communication to an output device, which is configured to perform multi-colorant rendering.

Figure 2:
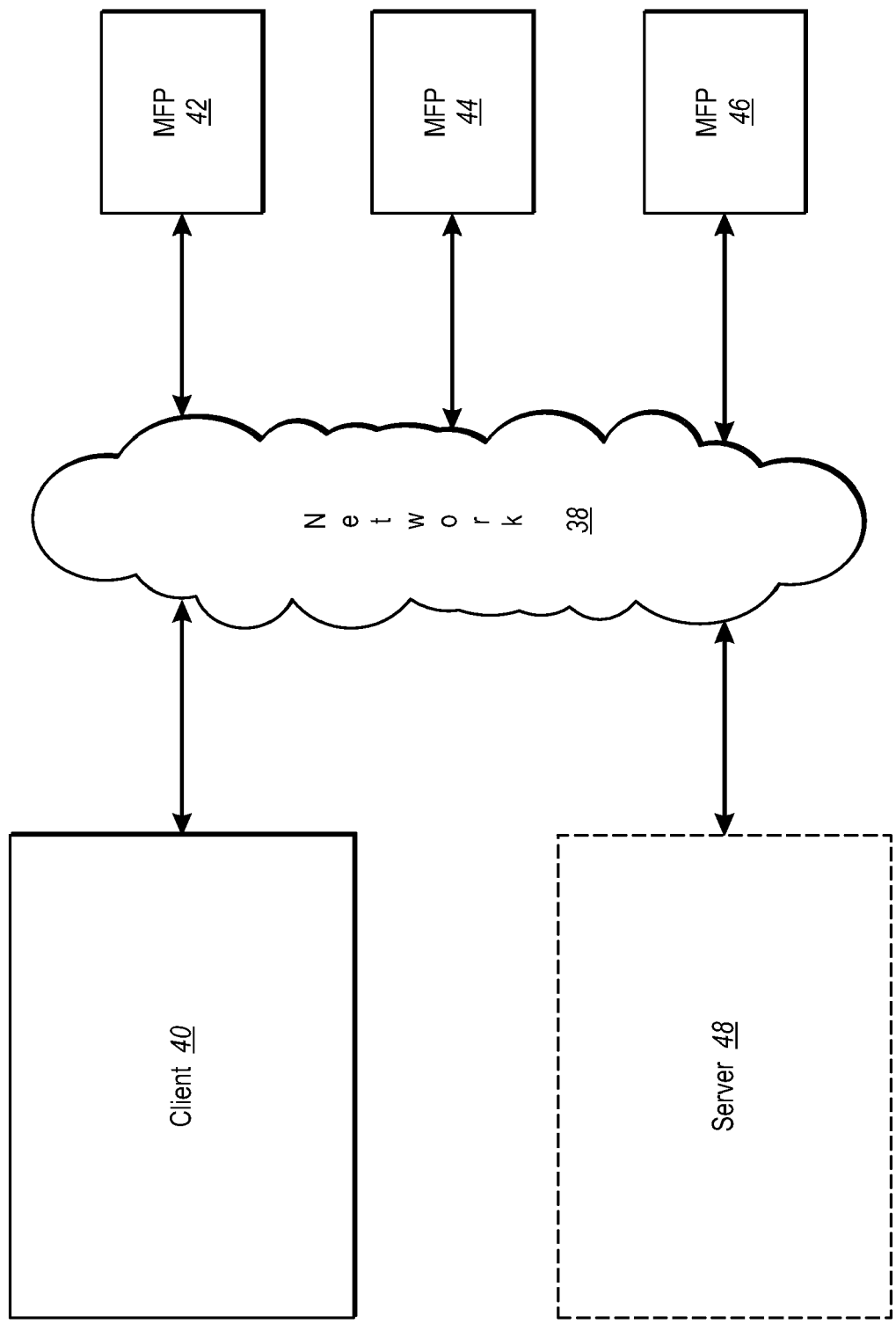
FIG. 2 illustrates a representative networked system configuration that provides a suitable operating environment for use with embodiments of the present invention.
Figure 3A:
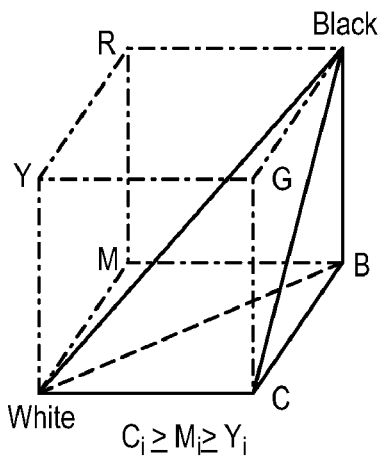
FIGS. 3A-3F shows how a colorant cube may be divided into six tetrahedra.
Figure 3B:
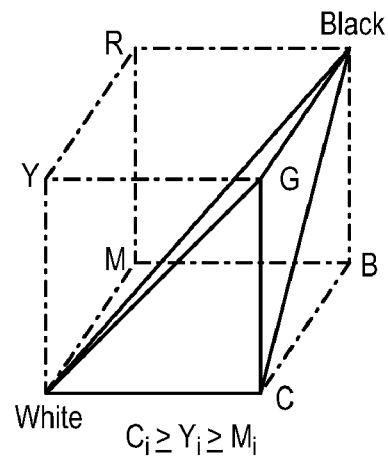
Figure 3C:
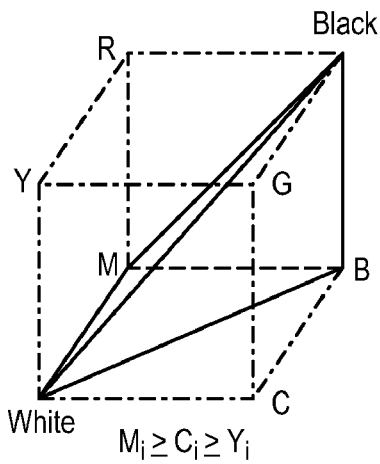
Figure 3D:
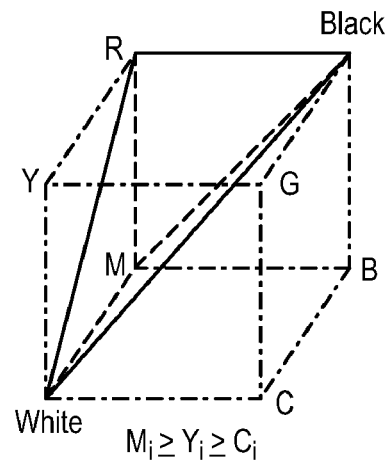
Figure 3E:
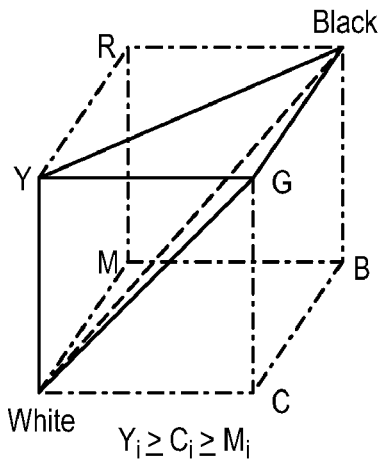
Figure 3F:
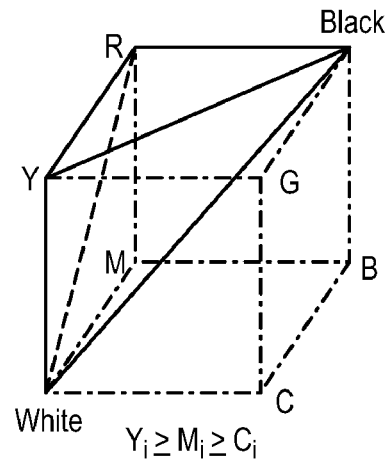

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to a plurality of peripheral devices (illustrated as multifunctional peripherals (MFPs) MFP 42, MFP 44, and MFP 46) across network 38. In FIG. 2, MFPs 42, 44, 46 may be any type of device that employs rendering. While FIG. 2 illustrates an embodiment that includes a client 40, three MFPs 42, 44, 46, and optionally a server 48, which may be a print server, connected to network 38, alternative embodiments include more than one client 40, fewer than three MFPs 42, 44, 46, more than three MFPs 42, 44, 46, no server 48, and/or more than one server 48 connected to network 38. Other embodiments of the present invention include local, networked, or peer-to-peer rendering environments where one or more computer devices are connected to one or more rendering devices. Moreover, embodiments in accordance with the present invention also embrace a single electronic consumer device, wireless networked environments, and/or wide area networked environments, such as the Internet.

While MFPs 42, 44, 46 are connected to network 38, embodiments of the present invention embrace the use of peripheral devices (e.g., MFPs) that are locally connected to a computer device, that are embedded, that are configured in a peer-to-peer printing environment, or that are configured in a wireless network environment.

Thus, in accordance with the illustrated embodiment and other embodiments of the present invention, limiting total colorant coverage in multi-colorant rendering is performed. In particular, embodiments of the present invention relate to systems and methods for transforming a specified colorant to create a second or resultant colorant in which the sum of the colorant components is limited so as not to exceed a specified maximum value. Accordingly, the transformed color is output, being within the total colorant coverage limit, as will be further described below.

Limiting Total Colorant Coverage

In our prior co-pending patent application Ser. No. 10/892,845, filed Jul. 16, 2004 and published as United States Patent Publication No. 2006/0012811 A1 on Jan. 19, 2006, which is incorporated by reference herein for all purposes, we developed a specific bijective transformation between the colorant-limited polytope and a "nominal colorant space" that fills a hypercube. With such a bijective transformation, colorant sampling and other manipulations can be performed using the nominal hypercube space and the results can be compressed from the nominal space back to the actual colorant-limited space. This greatly simplifies manipulation of the colorant-limited polytope space.

The method of our prior application constructs the bijective transformation based on a ray originating from a single point in the colorant limited polytope. Two intersection points on this ray are obtained: one point on the hyperplane on which the TAC is at the limiting value, and another point on the outer surface of the unlimited hypercube. The transformation is constructed by scaling the segment from the ray origin to the intersection of the hypercube surface onto the segment from the ray origin to the intersection of the TAC-limit hyperplane.

The current inventive method provides an alternative method for constructing the bijective transformation. The inventive method first divides the unlimited colorant hypercube into simplexes. Then, for each simplex, intersection points may be found between the hyperplane representing the TAC limit or constraint and the edges of the simplex. A barycentric interpolation technique may then be used to map the unlimited simplex onto a corresponding simplex within the colorant-limited polytope.

The technique may be illustrated for a three-dimensional colorant space, for example, CMY. The general technique may be extended to any number of dimensions, depending on the number of colorants available in a printer or other color rendering system. For the commonly-used four-dimensional CMYK space, the technique may be directly applied in the four-dimensional CMYK space, or a conditional three-dimensional colorant limitation may be applied while keeping one colorant, such as the K colorant, constant. For example, if the total CMYK limit is $L_{CMYK}$, then for any CMYK color, the CMY limit is $L_{CMY}=L_{CMYK}-K$.

Figure 4:
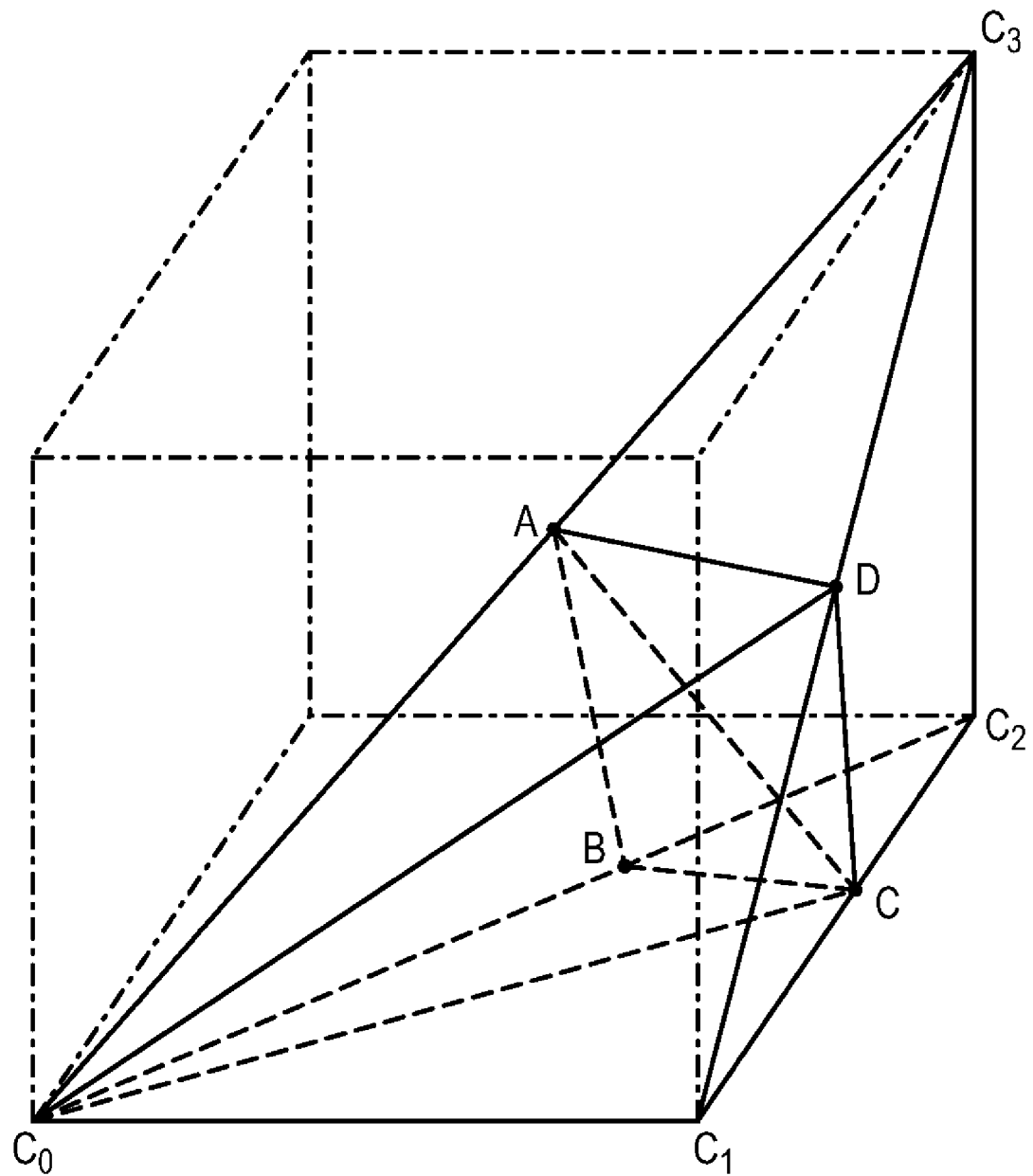
FIG. 4 shows the intersection of a total area coverage (TAC)-limit plane with a representative tetrahedron from FIG. 3A.

An unlimited three-dimensional colorant space may be represented by a 3-dimensional CMY cube. The representative 3-D CMY cube may be divided into six tetrahedra as shown in FIGS. 3A-3F. The tetrahedron to which each input CMY colorant belongs may be easily found out by sorting the CMY signals. For the illustrated subdivision scheme, each tetrahedron contains the following vertices: the white point (0% coverage), the dark point (300% coverage), a vertex of a single colorant fully applied (100% coverage) and a vertex of two colorants fully applied (200% coverage). A single representative tetrahedron is illustrated in FIG. 4, where $C_0$, $C_1$, $C_2$, and $C_3$ represent the 0% (white), 100%, 200% and 300% (dark) coverage points, respectively.

For the three-dimensional case, the TAC-limit hyperplane is a two-dimensional plane that intersects with the edges of the tetrahedron at three or four points depending on the total area coverage limitation value. If the TAC limit value is between 100% and 200%, then there will be four intersection points as shown in FIG. 4 as points A, B, C, and D. Otherwise (if the TAC limit is between 0% and 100% or between 200% and 300%), there will only be three intersection points. In general, the intersection points can be classified into two categories: the ones on the tetrahedron edges connected to the white point $C_0$ (points A and B in FIG. 4); and the others on tetrahedron edges not connected to the white point $C_0$ (points C and D in FIG. 4).

The next step is to construct a bijective mapping between the colorant-limited polytope $C_0ABCD$ and the nominal polytope $C_0C_3C_2CD$ for each of the six tetrahedra illustrated in FIGS. 3A-3F. In the illustrated example, polytope $C_0C_1CD$ is already within the colorant limitation and is not affected by the mapping. For the intersection points on the tetrahedron edges connected to the white point $C_0$, each vertex is mapped to the intersection point on the edge. As shown in FIG. 4, vertices $C_3$ and $C_2$ are mapped to intersection points A and B, respectively. Then, barycentric interpolation is used to map the points on polytope $C_0C_3C_2CD$ onto polytope $C_0ABCD$. In order to uniquely specify the interpolation algorithm, the polygon ABCD on the TAC-limit plane is divided into two triangles. A general tessellation (e.g., Delaunay tessellation) technique may be used to accomplish this. FIG. 4 shows a tessellation by connecting points A and C. The tessellation step described and illustrated with regard to the TAC-limit plane illustrated in FIG. 4 is not necessary if there are only three intersection points.

With the polygon on the TAC plane tessellated into triangles, the barycentric interpolation algorithm can be uniquely specified. The mapping is now partitioned into two mappings between tetrahedra: the mapping of tetrahedron $C_0C_3C_2C$ on $C_0ABC$ and the mapping of $C_0C_3DC$ onto $C_0ACD$. For a point P in $C_0C_3C_2C$, interpolation coefficients ($k_1$, $k_2$, and $k_3$) may first be found by solving equation 1:

$$\overrightarrow{C_0P}=k_1\overrightarrow{C_0C_3}+k_2\overrightarrow{C_0C_2}+k_3\overrightarrow{C_0C} \quad \text{(Equation 1)}$$

Then, the mapped point $P_m$ in $C_0ABC$ can be obtained by applying the barycentric weights within the nominal-space tetrahedron to the corresponding colorant-limited tetrahedron using equation 2:

$$\overrightarrow{C_0P_m}=k_1\overrightarrow{C_0A}+k_2\overrightarrow{C_0B}+k_3\overrightarrow{C_0C} \quad \text{(Equation 2)}$$

The mapping between $C_0C_3DC$ and $C_0ACD$ may be similarly obtained.

The technique described above for three-dimensional colorant limitation mapping can be generalized to N-dimensional colorant spaces having N greater than three. For such an N-dimensional colorant space, the triangular tessellation on the TAC-limit plane illustrated with reference to FIG. 4 will be generalized to the tessellation of (N–1)-dimensional simplexes on the TAC-limit hyperplane. The barycentric mapping between tetrahedra as exemplified in Equation 2 will be replaced by barycentric mapping between N-D simplexes, as will be readily appreciated by one of ordinary skill in the art.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. In a color rendering system, a method for limiting total colorant coverage using multidimensional simplicial subdivision and barycentric interpolation comprising:
   defining an n-channel colorant space without colorant limitation that may be represented as a first n-dimensional hypercube;
   applying a total area coverage (TAC) constraint to the n-channel colorant space to define a legal colorant space, wherein the TAC constraint may be represented as an (n–1)-dimensional hyperplane and the legal colorant space may be represented as an irregular polytope; and
   applying a bijective transformation between the legal colorant space and a nominal colorant space that may be represented as filling a second n-dimensional hypercube, the bijective transformation being constructed by:
      dividing the nominal colorant space into n-dimensional simplexes;
      finding, for each simplex, intersection points between the TAC constraint (n–1)-dimensional hyperplane and the edges of the simplex; and
      mapping each simplex of the nominal colorant space onto a corresponding n-dimensional simplex within the legal colorant space using a barycentric interpolation technique.

2. The method of claim 1 wherein the construction of the bijective transformation further comprises tessellating an (n–1)-dimensional convex polytope whose vertices are the intersection points into a set of (n–1)-dimensional simplexes on the TAC constraint (n–1)-dimensional hyperplane.

3. The method of claim 1 wherein the n-channel colorant space comprises a white point and wherein the mapping each simplex of the nominal colorant space onto a corresponding simplex within the legal colorant space comprises:
   identifying a set of edges of the simplex of the nominal colorant space that contain intersection points and that have the white point as one vertex and, for each edge of the set of edges, mapping a remaining vertex of the edge to a corresponding intersection point;
   finding barycentric weights for points within the simplex of the nominal colorant space; and
   finding mapped points within the legal colorant space by applying the barycentric weights to a corresponding simplex in the legal colorant space.

4. The method of claim 1 applied as an n-dimensional colorant limitation to an (n+1)-channel colorant space wherein one colorant is kept constant and the n-dimensional TAC constraint of the method of claim 1 is determined by reducing an (n+1)-dimensional TAC constraint by an amount corresponding to the colorant kept constant.

5. The method of claim 1 applied as an n-dimensional colorant limitation to an (n+m)-channel colorant space wherein m colorants are kept constant and the n-dimensional TAC constraint of the method of claim 1 is determined by reducing an (n+m)-dimensional TAC constraint by an amount corresponding to the m colorants kept constant.

6. The method of claim 1 applied to a three-channel colorant space.

7. The method of claim 1 applied to a four-channel colorant space.

8. The method of claim 1 wherein the method is used within a process for generating one or more color conversion lookup tables.

9. The method of claim 1 wherein the method is used to output a colorant that falls within the TAC constraint and wherein the colorant comprises a colorant selected from the group of:
   an ink;
   a toner; and
   a dye.

10. A multi-colorant rendering system comprising:
    an output rendering medium having a total area coverage (TAC) limit;
    a rendering mechanism configured to render color on the output rendering medium; and
    a processor coupled to the rendering mechanism and configured to:
       define an n-channel colorant space without colorant limitation that may be represented as a first n-dimensional hypercube;
       apply the total area coverage (TAC) limit to the n-channel colorant space to define a legal colorant space, wherein the TAC limit may be represented as an (n–1)-dimensional hyperplane and the legal colorant space may be represented as an irregular polytope; and
       apply a bijective transformation between the legal colorant space and a nominal colorant space that may be represented as filling a second n-dimensional hypercube, the bijective transformation being constructed by:
          dividing the nominal colorant space into n-dimensional simplexes;
          finding, for each simplex, intersection points between the TAC limit (n–1)-dimensional hyperplane and the edges of the simplex; and
          mapping each simplex of the nominal colorant space onto a corresponding n-dimensional simplex within the legal colorant space using a barycentric interpolation technique.

11. The system of claim 10 wherein the construction of the bijective transformation further comprises tessellating an (n–1)-dimensional convex polytope whose vertices are the intersection points into a set of (n–1)-dimensional simplexes on the TAC limit (n–1)-dimensional hyperplane.

12. The system of claim 10 wherein the n-channel colorant space comprises a white point and wherein the mapping each simplex of the nominal colorant space onto a corresponding simplex within the legal colorant space comprises:
    identifying a set of edges of the simplex of the nominal colorant space that contain intersection points and that have the white point as one vertex and, for each edge of the set of edges, mapping a remaining vertex of the edge to a corresponding intersection point;
    finding barycentric weights for points within the simplex of the nominal colorant space; and finding mapped points within the legal colorant space by applying the barycentric weights to a corresponding simplex in the legal colorant space.

13. The system of claim 10 wherein the processor is configured to apply an n-dimensional colorant limitation to an (n+1)-channel colorant space wherein one colorant is kept constant and the n-dimensional TAC limit of the system of claim 10 is determined by reducing an (n+1)-dimensional TAC limit by an amount corresponding to the colorant kept constant.

14. The system of claim 10 wherein the rendering mechanism is a printer coupled to a computer device and wherein the computer device comprises the processor.

15. The system of claim 14, further comprising a network, wherein the printer and the computer device are coupled via the network.

16. The system of claim 10 wherein the system is entirely contained within a single printing device.

17. In a color rendering system, a method for limiting total colorant coverage using multidimensional simplicial subdivision and barycentric interpolation comprising:
 defining an three-channel colorant space without colorant limitation that may be represented as a first three-dimensional cube;
 applying a total area coverage (TAC) constraint to the three-channel colorant space to define a legal colorant space, wherein the TAC constraint may be represented as a two-dimensional plane and the legal colorant space may be represented as an irregular polyhedron; and
 applying a bijective transformation between the legal colorant space and a nominal colorant space that may be represented as filling a second three-dimensional cube, the bijective transformation being constructed by:
  dividing the nominal colorant space into tetrahedra;
  finding, for each tetrahedron, intersection points between the TAC constraint plane and the edges of the tetrahedron; and
  mapping each tetrahedron of the nominal colorant space onto a corresponding tetrahedron within the legal colorant space using a barycentric interpolation technique.

18. The method of claim 17 applied as a three-dimensional colorant limitation to a four-channel colorant space wherein one colorant is kept constant and the three-dimensional TAC constraint of the method of claim 17 is determined by reducing a four-dimensional TAC constraint by an amount corresponding to the colorant kept constant.

19. The method of claim 17 wherein the construction of the bijective transformation further comprises tessellating a polygon on the TAC constraint plane into triangles.

20. The method of claim 17 wherein the three-channel colorant space comprises a white point and wherein the mapping each tetrahedron of the nominal colorant space onto a corresponding tetrahedron within the legal colorant space comprises:
 identifying a set of edges of the tetrahedron of the nominal colorant space that contain intersection points and that have the white point as one vertex and, for each edge of the set of edges, mapping the remaining vertex of the edge to a corresponding intersection point;
 finding barycentric weights for points within the tetrahedron of the nominal colorant space; and
 finding mapped points within the legal colorant space by applying the barycentric weights to a corresponding tetrahedron in the legal colorant space.

* * * * *